United States Patent [19]
Foley et al.

[11] Patent Number: 5,510,851
[45] Date of Patent: Apr. 23, 1996

[54] METHOD AND APPARATUS FOR DYNAMIC PURITY CORRECTION

[75] Inventors: Peter F. Foley, Los Altos Hills; Gregory E. Hale, Santa Clara, both of Calif.

[73] Assignee: Radius Inc., Sunnyvale, Calif.

[21] Appl. No.: 219,765

[22] Filed: Mar. 29, 1994

[51] Int. Cl.$^6$ .............................. H04N 5/21; H04N 17/02
[52] U.S. Cl. ........................ 348/658; 348/631; 348/179; 348/189; 345/199
[58] Field of Search ................................ 348/177–180, 348/182, 184, 189, 630, 624, 631, 650, 658, 656, 657, 649, 708, 577; 345/150, 153, 199, 186; H04N 5/21, 17/02

[56] References Cited

U.S. PATENT DOCUMENTS

| | | | |
|---|---|---|---|
| 4,658,286 | 4/1987 | Schwartz et al. | 348/179 |
| 4,740,820 | 4/1988 | Endo | 355/20 |
| 4,742,387 | 5/1988 | Oshima | 348/658 |
| 4,746,970 | 5/1988 | Hosokawa et al. | 348/658 |
| 4,962,418 | 10/1990 | Kamaga | 358/29 |
| 5,091,773 | 2/1992 | Fouche et al. | 348/189 X |
| 5,155,586 | 10/1992 | Levy et al. | 358/54 |

FOREIGN PATENT DOCUMENTS

0514025A2  11/1992  European Pat. Off. .......... G09G 1/28

OTHER PUBLICATIONS

Bartels, et al., "An Introduction to Splines for use in Computer Graphics & Geometric Modeling", pp. 400–406 Morgan Kaufmann Publishers, 1987.

Klassen, "Integer Forward Differencing of Cubic Polynomials: Analysis and Algorithms," ACM Transactions on Graphics, vol. 10, No. 2, pp. 157–181 (Apr. 1991).

Chang, et al., "Rendering Cubic Curves and Surfaces with Integer Adaptive Forward Differencing," Computer Graphics, vol. 23, No. 3, pp. 157–166 (Jul. 1989).

Foley et al., "Computer Graphics, Second Edition,"Section 11.2, pp. 478–513, Addison–Wesley Publishers (1990).

*Primary Examiner*—Victor R. Kostak
*Attorney, Agent, or Firm*—Limbach & Limbach

[57] ABSTRACT

The invention pertains to a method and apparatus for performing dynamic purity correction to insure that color purity is maintained across the face of a color monitor. The monitor displays a plurality of pixels, each having a particular luminescence value. Each luminescence value has several color components (E.g. red (R), green (G) and blue (B)). A grid of luminance measurements is made across the face of the monitor for each color component. From these luminance value grids, smoothly varying correction values are computed for each color component of each pixel by the interpolation of cubic splines, such as a Catmull-Rom spline. Incoming digital video signals are multiplied by corresponding correction values to insure color accuracy of the monitor. In a preferred embodiment, the calculation of correction values is repeatedly performed in real time (at the display dot clock rate) in a single monolithic RAMDAC integrated circuit to increase speed, improve fidelity, and minimize use of memory space.

23 Claims, 10 Drawing Sheets

$$L(t) = \frac{1}{2} \begin{bmatrix} t^3 & t^2 & t & 1 \end{bmatrix} \begin{bmatrix} -1 & 3 & -3 & 1 \\ 2 & -5 & 4 & -1 \\ -1 & 0 & 1 & 0 \\ 0 & 2 & 0 & 0 \end{bmatrix} \begin{bmatrix} P_{i-3} \\ P_{i-2} \\ P_{i-1} \\ P_i \end{bmatrix}$$

⊕   RGB LUMINOSITY MEASUREMENT POINTS

▨   VISIBLE SCREEN AREA

$$\begin{bmatrix} D \\ C \\ B \\ A \end{bmatrix} = \frac{1}{2} \begin{bmatrix} 0 & 0 & 0 & 1 \\ \beta^3 & \beta^2 & \beta & 0 \\ 6\beta^3 & 2\beta^2 & 0 & 0 \\ 6\beta^3 & 0 & 0 & 0 \end{bmatrix} \begin{bmatrix} -1 & 3 & -3 & 1 \\ 2 & -5 & 4 & -1 \\ -1 & 0 & 1 & 0 \\ 0 & 2 & 0 & 0 \end{bmatrix} \begin{bmatrix} P_{i-3} \\ P_{i-2} \\ P_{i-1} \\ P_i \end{bmatrix}$$

METHOD AND APPARATUS FOR DYNAMIC PURITY CORRECTION

FIELD OF THE INVENTION

The invention pertains to a method of improving the color accuracy of a monitor by compensating for the luminance variations that occur across the face of the monitor by computing and then applying smoothly varying correction values to each color component of each pixel in real time.

BACKGROUND OF THE INVENTION

Monitors have been increasingly used in photorealistic color production and prepress systems. Accordingly, it is important that any luminance variations across the face of the monitor be corrected in order to insure color accuracy and predictability. If luminance differences exist between color channels, then color purity will be compromised.

Luminance variations can be introduced into a monitor by a number of ways including, but not limited to, aging, shock, non-uniformities in phosphor deposition, shadow mask imperfections or thermal changes, differences in the beam energies of the different electron grins, and the position of the monitor relative to earth's magnetic field. The variations so introduced must be compensated for and corrected to maintain high color purity and uniformity.

One possible solution is to manufacture monitors to tight luminance and color purity specifications. However, such techniques increase their cost.

Existing systems adjust luminance by the addition of expensive, cumbersome, and complex external hardware that intercepts and modifies the video signal in the analog domain before it reaches the monitor.

European Patent Application Publication No. 514 025 A2 by Rasterops Corporation, published Nov. 19, 1992, discloses the use of a video normalizer to correct irregularities in video display monitor screens. A photo sensor detects the light output at various points on the monitor. These output values are converted to digital signals and processed to compute correction values. The correction values are then provided to a separate frame buffer that is external to the computer having a memory location for each pixel on the monitor display. A correction circuit converts these digital signals into analog correction signals which in turn either skew the output signals of the video color processing board or control transconductance amplifiers connected between the video color processing board and the RGB inputs of the monitor. This method has some problems in terms of speed. Applying correction signals in the analog domain or using them to control transconductance amplifiers causes an undesirable delay in processing when individual correction values need to be applied to the individual color components of each pixel. Also, this method provides monitor luminance correction (ie. the same correction to each color component), instead of dynamic purity correction which involves individual correction for each color component.

The present inventor has recognized that a preferable system would be able to rapidly calculate and apply smoothly varying correction signals in the digital domain on a pixel by pixel basis, for each color component, and that it would be advantageous for such a system to continuously calculate correction values for each pixel in real time (at the display dot clock rate) to avoid having to continuously store and retrieve these values. However, until the present invention, it had not been known how to overcome the limitations of the described prior art, or how to implement the described improvements over the prior art.

SUMMARY OF THE INVENTION

The present invention provides a method for dynamically adjusting the luminance of each color channel digitally in real time. This "on the fly" approach reduces the complexity and enhances the speed and fidelity of dynamic purity correction, where "dynamic purity correction" denotes the process of determining correction values for each color component of each pixel of a monitor and multiplying incoming digital video signals by these correction values so that the resulting images accurately represent the information contained in the incoming signals.

According to the present invention, three separate correction data streams (each representing a smooth 3-dimensional correction surface) are generated by processing a regular grid of luminosity sample points (one for each color component, typically from the set of red (R), green (G), and blue(B) color components) by interpolating Catmull-Rom splines, and then multiplying the incoming color (typically RGB) components of each pixel of an input image data stream by the corresponding correction factor.

The use of cubic polynomials (of which Catmull-Rom splines are one form) to create the smooth correction surfaces results in corrected images that do not have visual artifacts (discontinuities) introduced by the correction process.

DETAILED DESCRIPTION OF THE PREFERRED EMBODIMENTS

Figure 1:
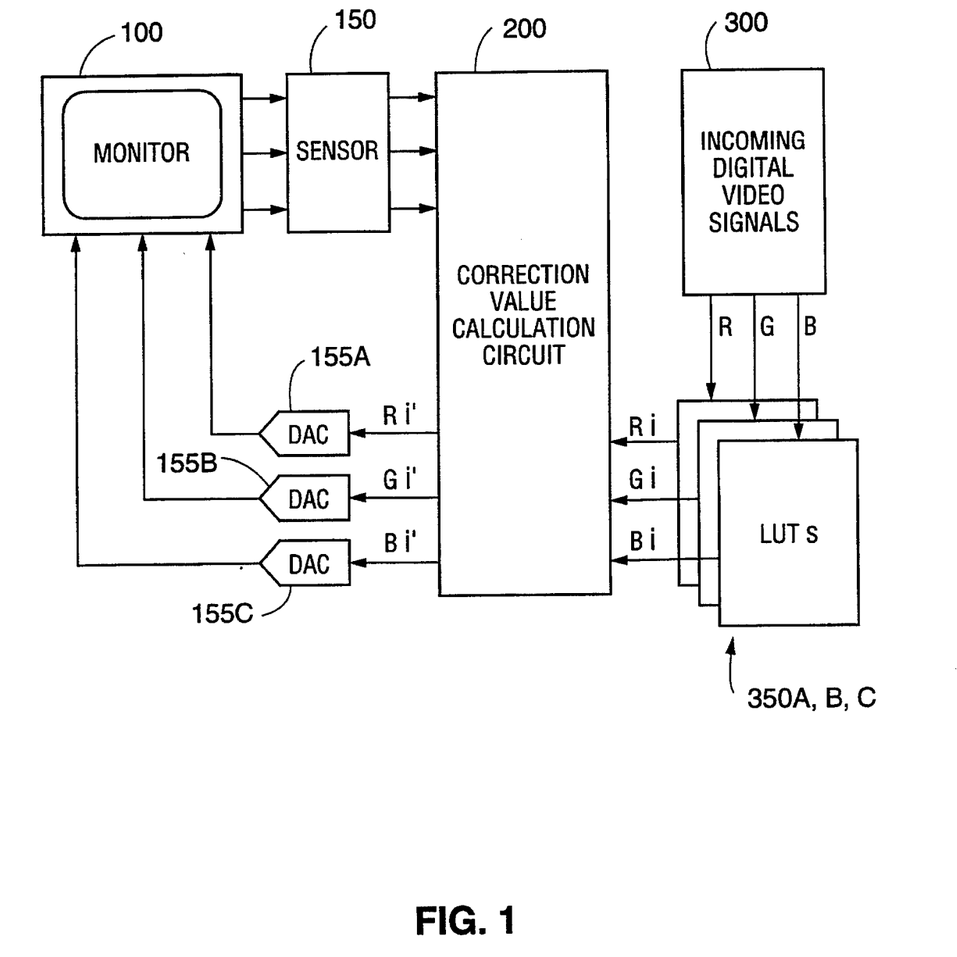
FIG. 1 is a block diagram of a system for implementing the method of the present invention.

A system employing an embodiment of the present invention is shown in FIG. 1. Although the technique is described in relation to a color monitor, the same technique can be used to improve the display accuracy of a monochrome monitor. Red, Green and Blue (RGB) luminosity components are measured at each of a plurality of measurement points across the face of a monitor 100. These luminosity values can be measured via a sensor 150, which measures, in the case of an RGB monitor, a red value (R), a blue value (B), and a green value (G) at a grid of regularly spaced points on the face of monitor 100. The sensor then supplies these values to a correction value calculation circuit (CVCC) 200. These luminosity values are processed in the CVCC 200, where a correction value is calculated for each color component of each individual pixel. For example, for an RGB color monitor, correction values Cr, Cg, or Cb would be calculated for the corresponding red (R), green (G), and blue (B) components of each pixel. Digital video signals, coming from block 300, whose color component signals are represented as R, G and B, are input to Color Lookup Tables (LUT) 350*a,b,c*, the resulting outputs Ri, Gi, and Bi of the LUTs are corrected to compensate for any detected luminosity variations that exist across the face of the monitor. The resulting corrected signals Ri', Gi' and Bi' are fed to monitor 100 after being converted to analog values by digital to analog converters (DACs) 155*a*, 155*b*, 155*c*.

Figure 2:
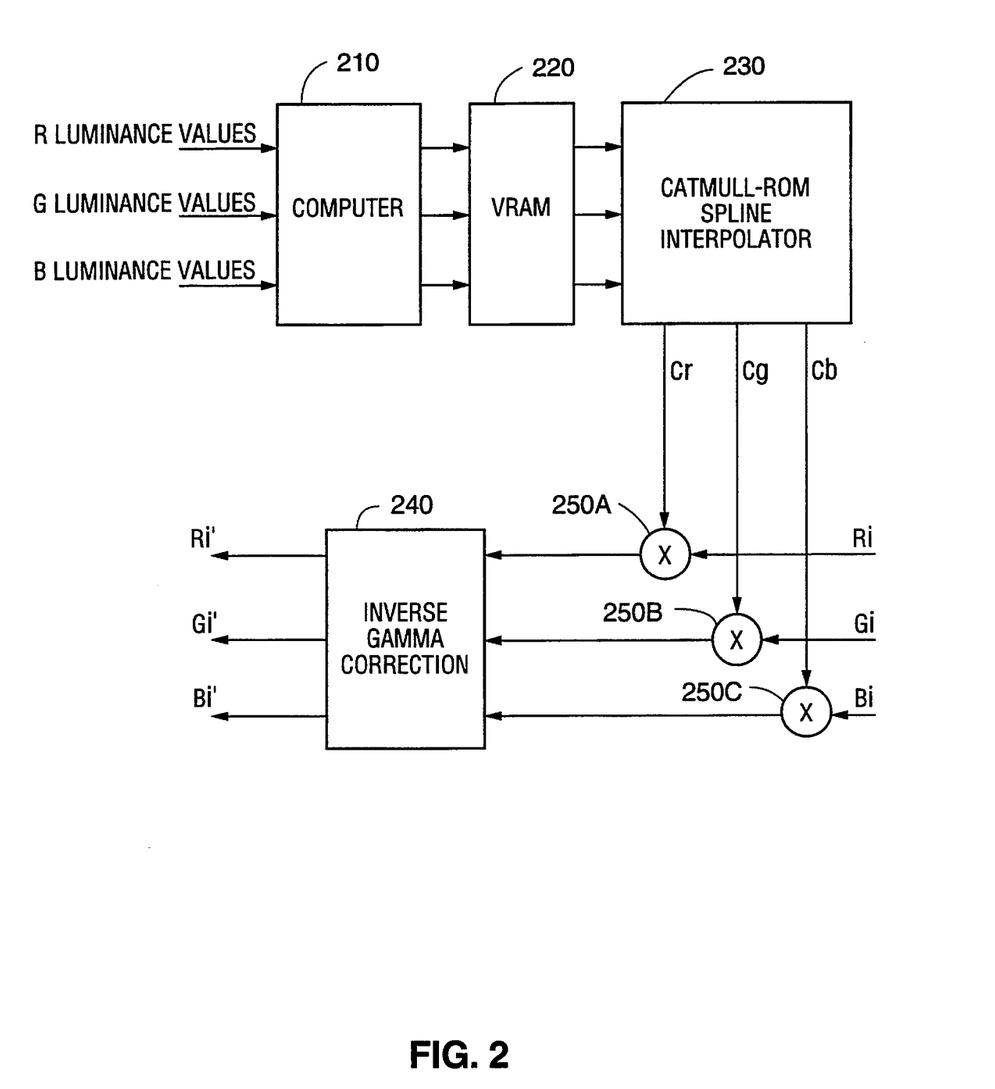
FIG. 2 is a block diagram of the Correction Value Calculation Circuit block of FIG. 1.

The CVCC 200 is detailed in FIG. 2. The luminosity values measured by sensor 150 are supplied to a computer 210 which generates from the measured luminosity values a regular grid of luminosity values suitable for interpolating via Catmull-Rom splines a correction surface equal in size to that of the display. Each vertically (Y) direction aligned set of luminosity measurements is then interpolated into a smooth curve by the computer 210. In the preferred embodiment, these curves are also generated by interpolating Catmull-Rom splines where each interpolated point on a curve is separated in the Y direction from its neighbors by one pixel. These curves are stored in local VRAM 220 to be retrieved as control points during the raster scan of the image.

During the raster scan of the image, for each scanline, a set of control points, one point from each of the vertically interpolated curves, is retrieved from the VRAM and supplied to the Catmull-Rom spline interpolator 230. The interpolator computes a smooth Catmull-Rom spline of correction values in the horizontal (X) direction on the fly through the control points for each color component, and these correction values (shown as Cr, Cg, and Cb) are subsequently multiplied by the incoming digital video signals as shown in FIG. 2.

In this way, by first interpolating curves in the Y direction, and then using those curve values as control points to interpolate curves in the X direction, a 3-dimensional correction surface is constructed.

The corrected color components are then gamma corrected 240 to compensate for monitor gamma, which is a function of signal amplitude, and emerge from the correction value calculation circuit as Ri', Gi', and Bi' in FIG. 2.

A more detailed discussion of the interpolation technique follows.

In block 200 of FIG. 1 smooth correction surfaces are derived by interpolating Catmull-Rom splines through luminosity sample points for each corresponding color component, first in the vertical (Y) direction by a computer, and then in the horizontal (X) direction in real time as the image is raster scanned. E.g., a set of N "Red" luminosity samples (R), from a set of N control points on the face of the monitor, are processed to generate a correction surface having M values (where M>N, and M=the total number of pixels displayed by the monitor).

Figure 3:
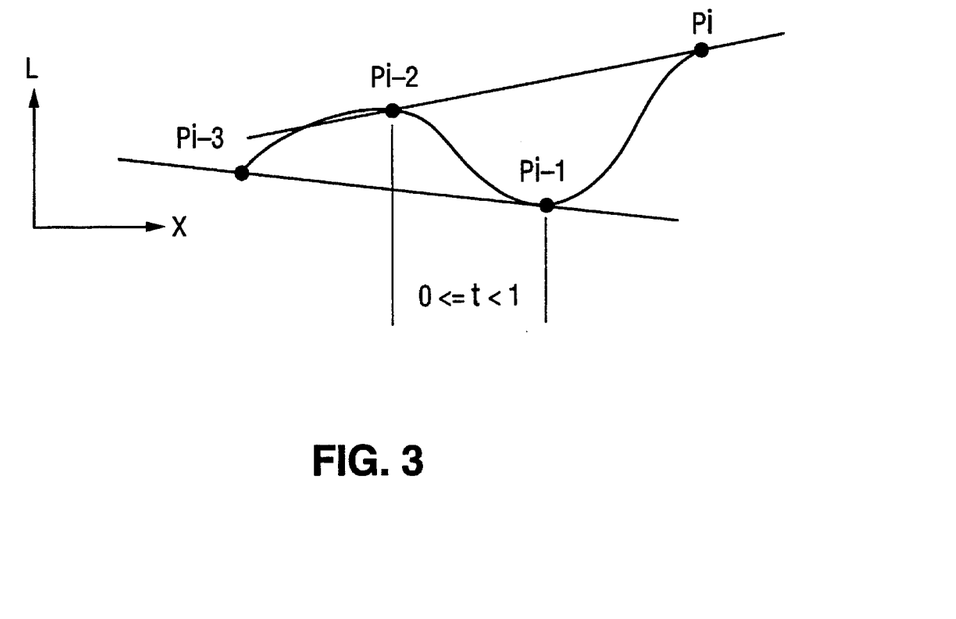
FIG. 3 is a diagram representing a Catmull-Rom Spline.

Catmull-Rom splines are a class of splines where the spline actually passes through (interpolates) the sample (control) points. Furthermore, the slope of the spline as it passes through a control point is equal to the slope formed by drawing a line through the control points on either side of the control point being interpolated. This results in a smooth, well behaved curve. An example of a Catmull-Rom spline, which passes through four control points, is shown in FIG. 3. Four control points (Pi-3, Pi-2, Pi-1, and Pi) are required to interpolate the spline between the points Pi-2 and Pi-1. This section of the spline between points Pi-2 and Pi-1 is called a polynomial segment.

Figure 4:
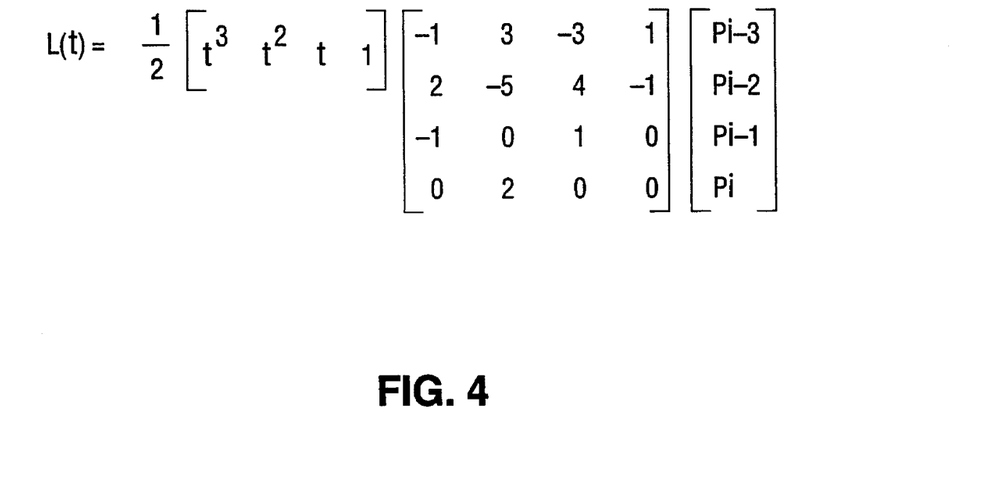
FIG. 4 represents a Basis Matrix for the Catmull-Rom Spline.

Catmull-Rom splines are a class of parametric cubic curves. That is, both dimensional components (luminosity (L), and X, where X represents a location on the face of the monitor) of the curve are parameters of some third independent variable, t. The curve is approximated by a piecewise polynomial curve that is described by cubic polynomials that are parametric in t. The equations are:

$$L(t)=a_1 t^3 + b_1 t^2 + c_1 t + d_1 \tag{1}$$

$$X(t)=a_x t^3 + b_x t^2 + c_x t + d_x \tag{2}$$

Where t varies between $0 \leq t < 1$. The coefficients, a,b,c, and d, are computed using the basis matrix for Catmull-Rom splines. This basis matrix is shown in FIG. 4.

Preferably, t should be chosen such that each step of t corresponds to a one pixel move across (or down) the display. If the control points are regularly spaced in the X axis, then x changes linearly in t. Hence, if the control points are 128 pixels apart, then stepping t $1/128$ will result in stepping x one pixel. Therefore x can be ignored as a parametric function of t.

The interpolated spline can have values greater than the maximum control point values. In FIG. 3, the luminosity values just to the left of Pi-2 are greater than Pi-2 (which is necessarily the case with a smooth curve because the slope of the curve at point Pi-2 is decreasing), hence some "headroom" has to be accounted for when providing the control points to the spline interpolation hardware if overflow is to be avoided.

As previously explained, a regularly spaced grid of luminosity measurements is taken for each color component. In a preferred embodiment of the invention, the measurements are made 128 pixels apart, by a sensor such as sensor 150 in FIG. 1. For a 72 dpi monitor this works out to a spacing between measurements of about 1.75". An example of such a grid for a 1280×1024 display with 63 measurement points is shown in FIG. 6.

Figure 6:
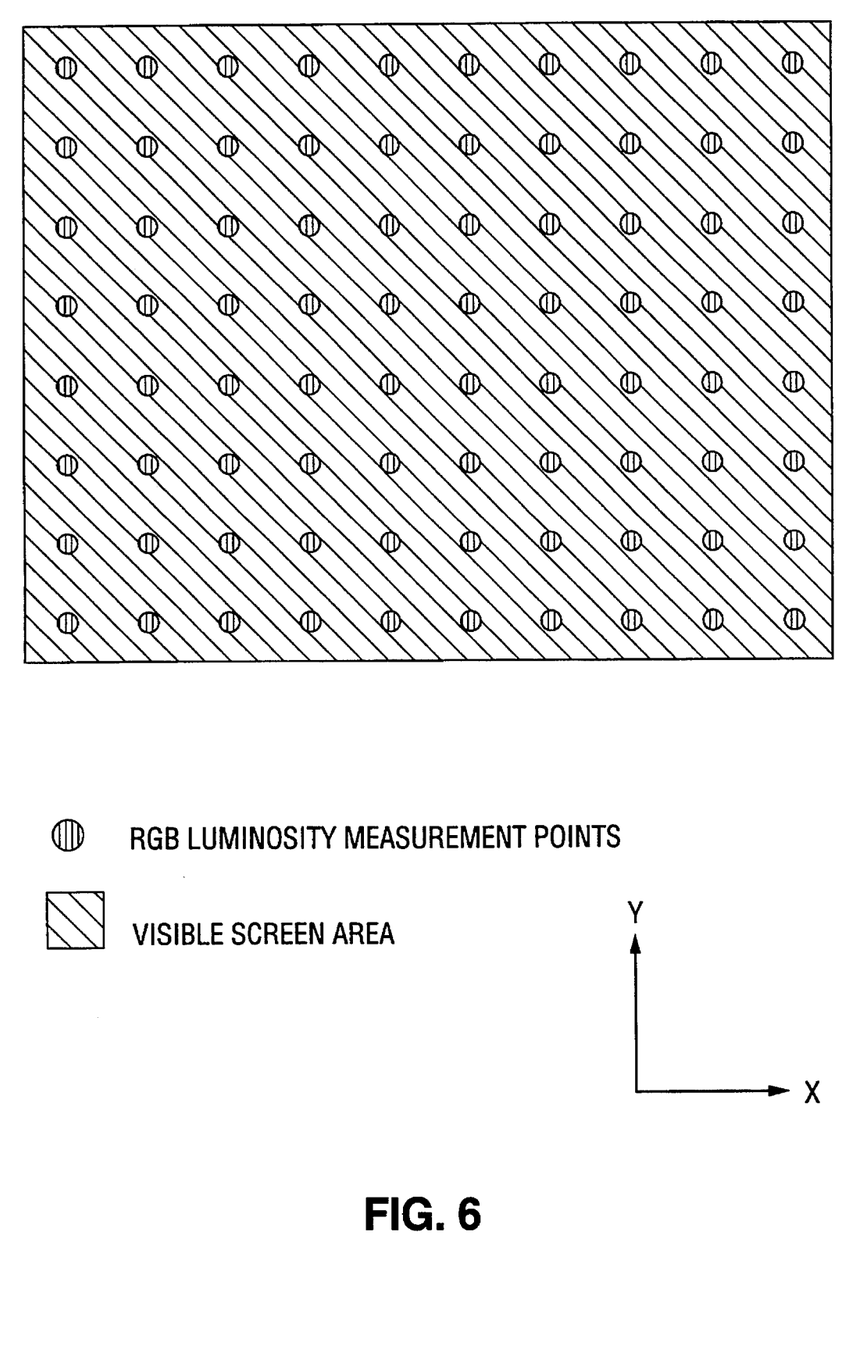
FIG. 6 is a diagram representing the RGB Luminosity Measurement Grid of an embodiment of the present invention.
Figure 7:
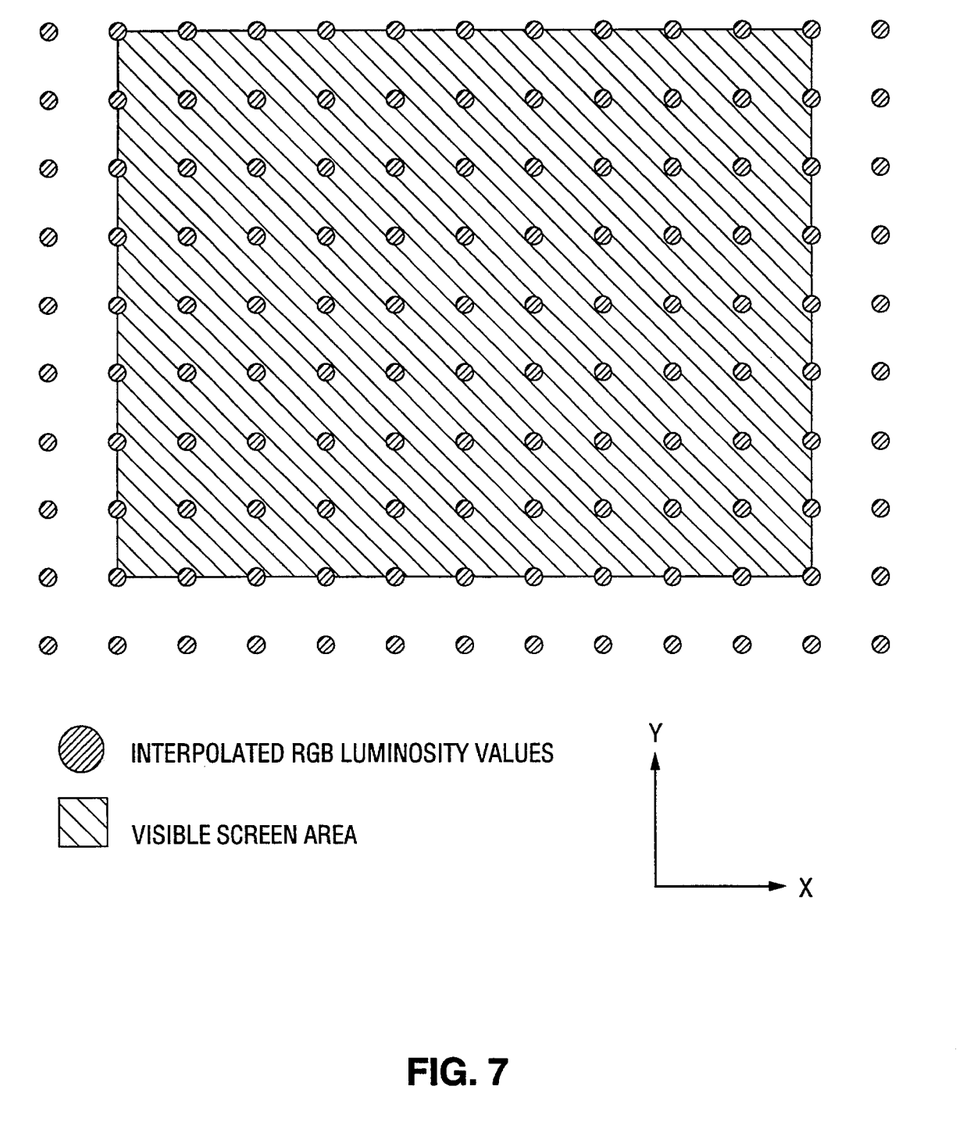
FIG. 7 is a diagram representing the Interpolated RGB Luminosity Measurement Grid of an embodiment of the present invention.

In order to conveniently compute the Catmull-Rom splines for correction surface in the visible display area, a luminosity value grid of 143 points is formed (for each color component) from the measurement grid of FIG. 6 to create the interpolated RGB luminosity value grid shown in FIG. 7. The additional interpolated points both on and outside the boundary of the visible display area in FIG. 6 can be extrapolated from the measured points by a variety of techniques. In the preferred embodiment, some of the points are made by duplicating points near the boundary of the measured grid, and some are made by linearly interpolating the slope formed by the points near the boundary of the measured grid.

In order to prevent overflow, or to account for "headroom" mentioned above, in the preferred embodiment, the entire 3-dimensional correction surface is computed on computer 210 using the interpolated RGB luminosity value grid shown in FIG. 7, and all the luminosity values are uniformly adjusted such that no point on the surface exceeds, or overflows, a maximum value.

One way of arriving at the grid of measured RGB luminosity values would be to implement sensor 150 as a jig having an array of photometers being placed across the face of the monitor. This array of photometers would be used to measure the screen RGB luminosity data shown in FIG. 6.

For a 1280×1024 display, each of the three (RGB) visually smooth 3-dimensional luminance correction surfaces is comprised of 1,310,720 (1280×1024=1,310,720) smoothly varying points interpolated from a grid of 80 luminosity values.

For each scanline, the precomputed control points are loaded from VRAM 220 into the Catmull-Rom spline interpolator 230 prior to the start of the scan.

The straightforward evaluation of L(t) using previously disclosed equation (1) requires a computationally intensive number of multiplies, additions, and shifts. A more computationally efficient evaluation can be accomplished using forward differences, which is an approximation that reduces evaluation of the cubic polynomial to straightforward shift and adds. A derivation of this method and additional information regarding this method can be found in the following references: (1) Foley & Van Dam, "Computer Graphics, Second Edition", Addison-Wesley Publishers, 1990; (2) Victor Klassen, Integer Forward Differencing of Cubic Polynomials: Analysis and Algorithms", *ACM Transactions on Graphics,* April 1991; (3) Sheue-Lin Chang, Michael Shantz and Robert Rochetti, Rendering Cubic Curves and Surfaces with Integer Adaptive Forward Differencing, *ACM Computer Graphics,* Volume 23, Number 3, July 1989; and (4) Richard Barrels, John Beatty, and Brian Barsky, "An Introduction to Splines for use in Computer Graphics & Geometric Modeling", pp. 400–406, Morgan Kaufmann Publishers, 1987.

Figure 8:
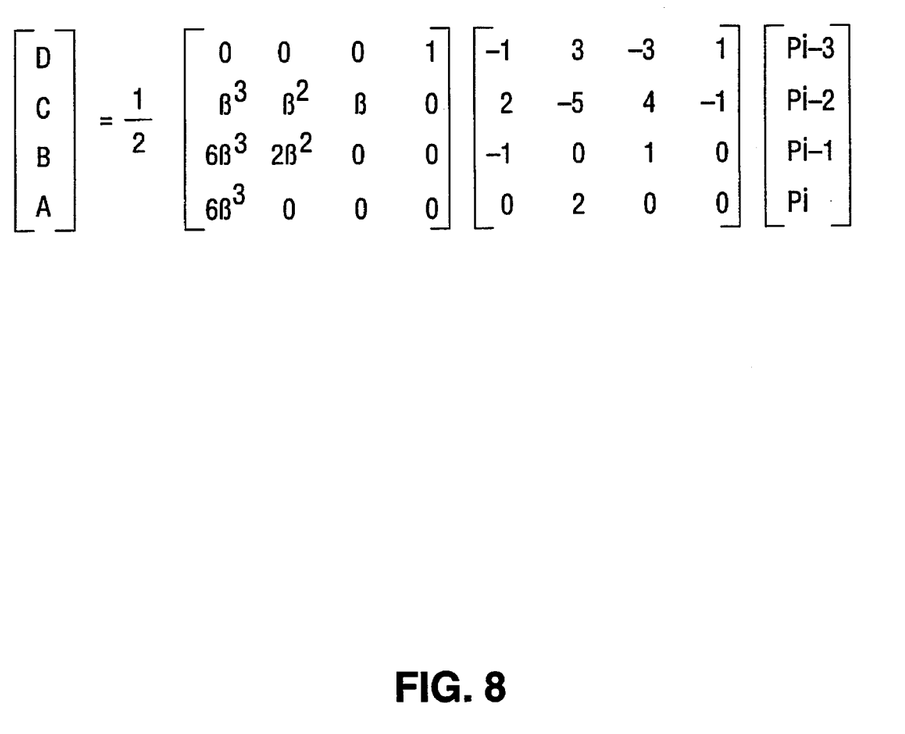
FIG. 8 represents a matrix formed by applying the Forward Difference Basis Matrix to the Catmull-Rom Basis Matrix of FIG. 4.

Evaluation of a spline between control points $P_{i-2}$ and $P_{i-1}$ reduces to the following set of 3 adds and 3 shifts that occur at the dot clock frequency (up to 216 MHZ in the preferred embodiment) for each color component. The symbol ">>" is used to indicate a right shift:

$$L = D >> 8 \quad (3)$$

$$D = D + (C >> 7) \quad (4)$$

$$C = C + (B >> 6) \quad (5)$$

$$B = B + A \quad (6)$$

Where D,C,B,A are integer forward difference coefficients that are found by applying the forward difference basis matrix to the Catmull-Rom basis matrix previously disclosed in FIG. 4. An example of the resulting matrix is shown in FIG. 8, where $\beta = 1/128$.

Figure 5:
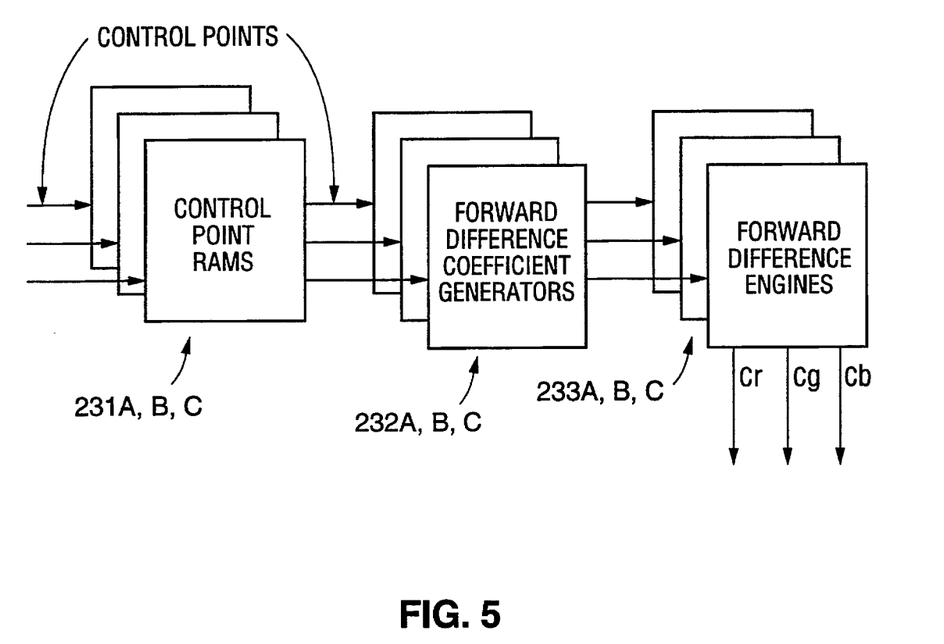
FIG. 5 is a diagram of the Spline Interpolator 230 of FIG. 2.

The control points (or Pi's) for each scanline are loaded from VRAM 220 into the Control Point RAMs 231$a,b,c$ as shown in FIG. 5, prior to the start of the scanline. The Forward Difference Coefficients (D,C,B,A) for polynomial segment N+1 are precomputed on the fly by the Forward Difference Coefficient Generators 232$a,b,c$ as polynomial segment N is interpolated. Thus, there are 128 dot clock periods available to precompute the Catmull-Rom forward difference coefficients D,C,B and A. For each color component of each pixel, the forward difference engines 233$a,b,c$ compute the resulting correction values (shown as Cr, Cg, Cb in FIG. 5) by evaluating equations 3–6 to find L.

The coefficient computation reduces to the following set of equations:

$$D = P_{i-2} \quad (7)$$

$$C = K_{c-3} * P_{i-3} + K_{c-2} * P_{i-2} + K_{c-1} * P_{i-1} + K_c * P_i \quad (8)$$

$$B = K_{b-3} * P_{i-3} + K_{b-2} * P_{i-2} + K_{b-1} * P_{i-1} + K_b * P_i \quad (9)$$

$$A = K_{a-3} * P_{i-3} + K_{a-2} * P_{i-2} + K_{a-1} * P_{i-1} + K_a * P_i \quad (10)$$

As a result, 12 multiplies and 9 adds must be performed for each color channel during the 128 dot clock periods required to compute the next set of forward difference coefficients.

As previously stated, in our implementation x changes linearly with t so that stepping $1/128$ steps× one pixel. Thus, there is no need to utilize more sophisticated integer forward differencing techniques such as adaptive integer forward differencing.

The K's, in equations 7–10, are constants whose two's compliment hex values are given below in TABLE 1. Note that the radix point is actually 21 bits to the left of the least significant bit.

TABLE 1

| | |
|---|---|
| $K_{c-3}$ | =0xffffc0ff |
| $K_{c-2}$ | =0xffffffd83 |
| $K_{c-1}$ | =0x000041fd |
| $K_c$ | =0xfffff81 |
| $K_{b-3}$ | =0x000001fa |
| $K_{b-2}$ | =0xfffffb12 |
| $K_{b-1}$ | =0x000003ee |
| $K_b$ | =0xffffff06 |
| $K_{a-3}$ | =0xfffffffa |
| $K_{a-2}$ | =0x00000012 |
| $K_{a-1}$ | =0xffffffee |
| $K_a$ | =0x00000006 |

Figure 9:
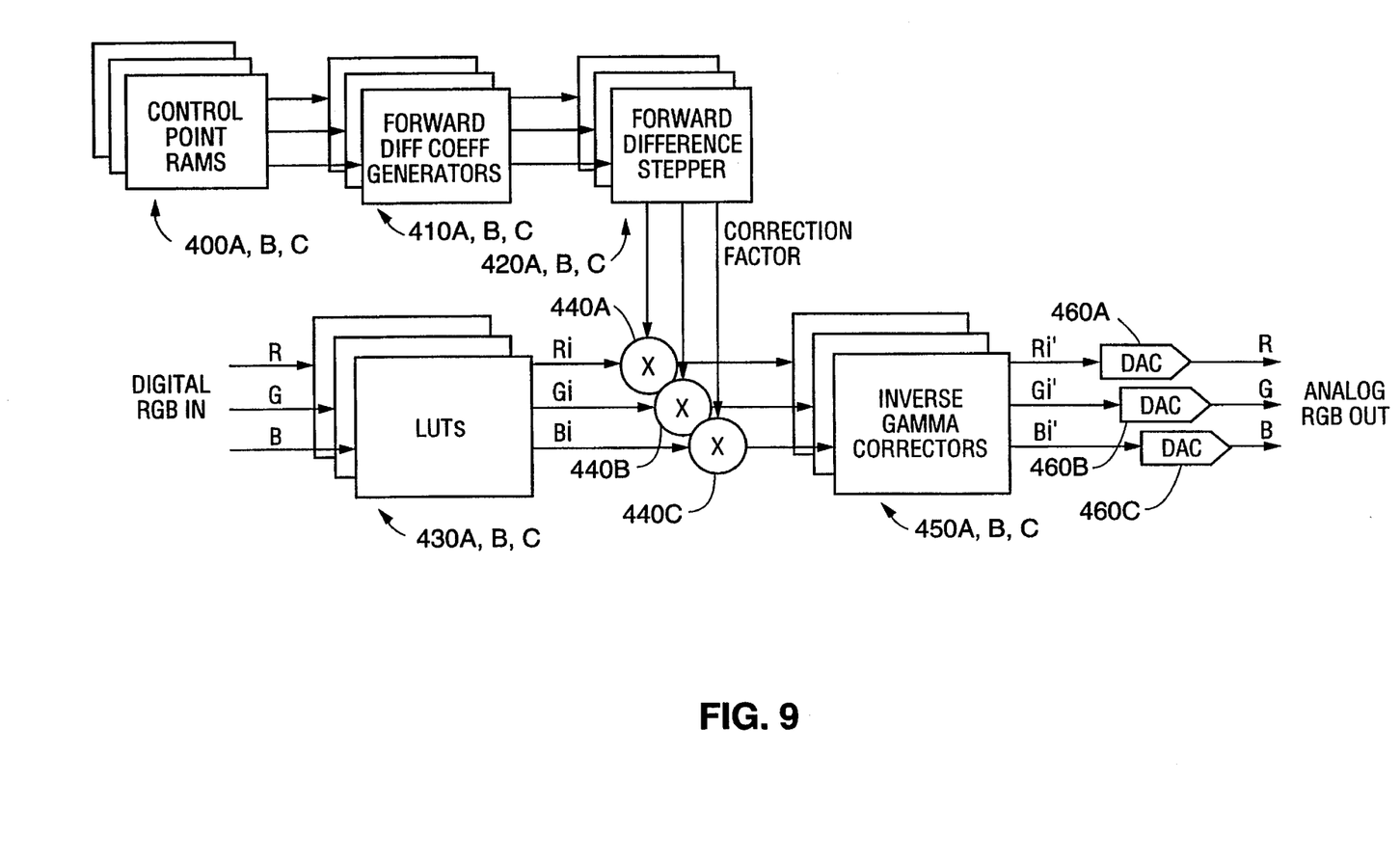
FIG. 9 is a block diagram of the RAMDAC Dataflow of an embodiment of the present invention.

A block diagram of the data flow of a RAMDAC monolithic integrated circuit of a preferred embodiment of the present invention is shown in FIG. 9. The Control Point RAMs 400$a,b,c$ and Forward Difference Coefficient Generators 410$a,b,c$ and Forward Difference Engines 420$a,b,c$ (shown in more detail in FIGS. 10–12) correspond to CVCC 200 of FIG. 1 and is detailed in FIG. 2. Each of the three Control Point RAMs 400$a,b,c$ can contain 18 control points, which will support a display that is 1920 pixels wide.

For a 1920×1030 display, there are 18×3×1030 or 55,620 Luminosity Control Points (Pi's) to be stored in VRAM. If two bytes of storage are used for each Luminosity Control Point, then this represents approximately a 1.9% memory storage overhead for 24 bit color as compared to the storage requirements for the image itself.

With reference again to FIG. 9, after the Forward Difference Engines 420$a,b,c$ compute the correction values, the correction values are combined with the outputs of the color lookup tables (LUTs) in multipliers 440$a,b,c$ (where these multipliers correspond to multipliers 250$a,b,c$ of FIG. 2). The outputs of the multipliers are gamma corrected in the Inverse Gamma Correction circuits 450$a,b,c$ to produce corrected values Ri', Gi', and Bi'. These corrected values are then convened into analog signals by digital-to-analog converters 460$a,b,c$.

Figure 10:
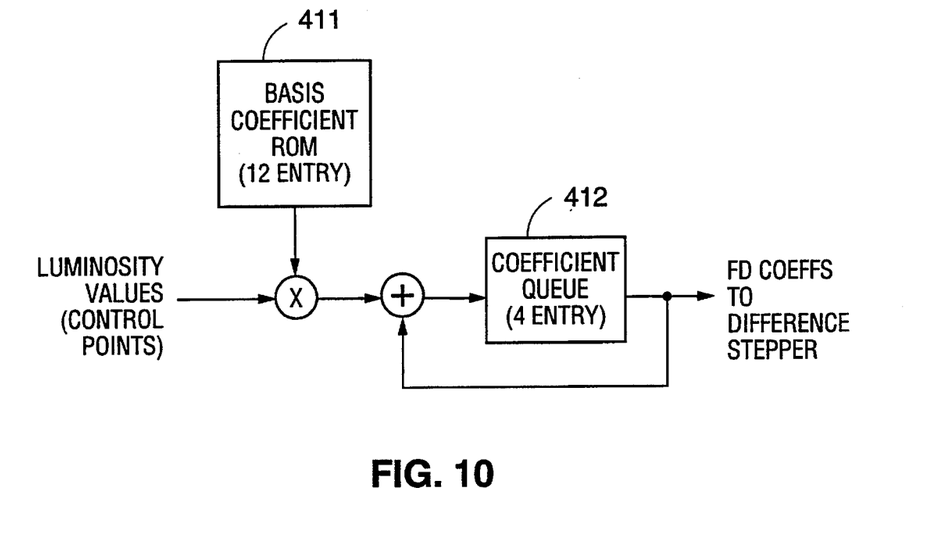
FIG. 10 is a more detailed block diagram of the Forward Difference Coefficient Generator shown in FIG. 9.

The logic in the Forward Difference Coefficient Generators 420$a,b,c$ of FIG. 9 is shown in FIG. 10. The luminosity values are combined with a Basis Coefficient ROM 411, containing Basis Coefficients. These Basis Coefficients are preferably directly wired into the datapath. The Coefficient Queue 412 holds intermediate results (multiply-accumulate) of each coefficient calculation, and stores the coefficients until they can be transferred to the Forward Difference Stepper at the end of the current polynomial segment.

Figure 11:
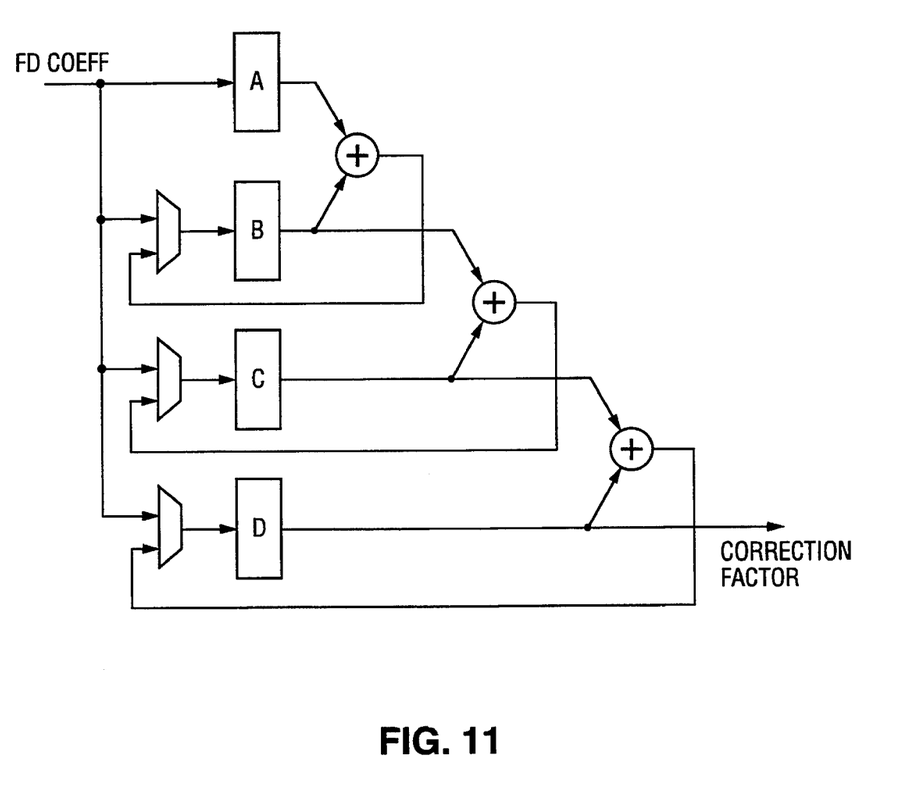
FIG. 11 is more detailed block diagram of the Forward Difference Stepper shown in FIG. 9.

The logic in the Forward Difference Stepper is shown in FIG. 11. Integer forward differencing has the disadvantage that error accumulates rapidly. Hence a sufficient number of fractional bits must be carried in the coefficient registers to insure that error on the order of a luminosity value LSB does not occur. One technique, first discussed by Bartels et al. discusses the use of successive guard bits to achieve higher precision (ie. allow more forward steps) while using fewer bits. See. Richard Bartels, John Beatty, and Brian Barsky, "An Introduction to Splines for use in Computer Graphics & Geometric Modeling", pp. 400–406, Morgan Kaufmann Publishers, 1987. Hence the higher order registers, A and B, contain more fractional bits, and some number of bits are truncated from B before it is added to C. This creates the illusion of more fractional bits for the C and D register, thus freeing up more bits for the significand. While the truncations add additional error, the overall increase in bits makes the tradeoff well worthwhile.

A theoretical analysis of error accumulation using successive guard bits indicates that the size of the fractional parts of the coefficient registers should be as shown in the following table, TABLE 2.

TABLE 2

| | |
|---|---|
| A,B | 24 bits |
| C | 16 bits |
| D | 9 bits |

Figure 12:
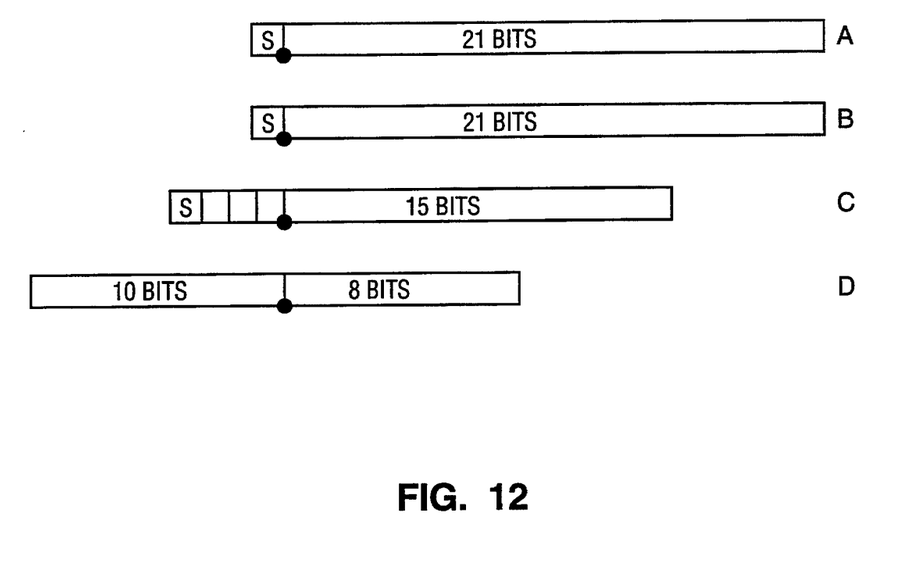
FIG. 12 is a diagram of the Integer Forward Difference Coefficient Registers of an embodiment of the present invention.

However, because this application is well behaved (no more than 40% variation between adjacent control points), it is possible to get by with fewer fractional bits, as shown in FIG. 12.

These register sizes were empirically shown to be sufficient by generating correction surfaces for a number of "worst case" grids of luminosity control points using Integer Forward Differencing and comparing the outputs to a correction surface generated using full double precision floating point.

Note that the radix point for register D is shown 10 bits to the right of the MSB. This is because in simulations to verify the operation of the invention, actual visible correction surfaces were generated from luminosity data, rather than corrections to actual images. In the preferred embodiment, the radix point would be to the left of the MSB, and the upper fractional 10 bits would be sent to the multiplier to modify the incoming pixel color component.

Rather than compute the Integer Forward Difference coefficients on the fly in the RAMDAC, it may be possible to transmit the differences between successive A,B,C, and D coefficients during the horizontal retrace rather than the Luminosity Control Points. If the differences between successive coefficients is small enough, perhaps the penalty of the extra data transfer per horizontal retrace and extra on board RAM would be less than the silicon area required to calculate the coefficients on the chip (multipliers, etc).

Unfortunately, due to the high degree of fractional accuracy required in order to control the rapidly propagating error, the Integer Forward Difference coefficients are quite sensitive to changes in the Luminosity Control Points.

When adjacent Control Points differed by 35%, the maximum differences between successive coefficients required the number of bits shown in TABLE 3.

TABLE 3

| | |
|---|---|
| A | 12 bits |
| B | 18 bits |
| C | 16 bits |
| D | 18 bits |

When adjacent Control Points differed by only 2.5%, the maximum differences between successive coefficients required the number of bits shown in TABLE 4.

TABLE 4

| | |
|---|---|
| A | 9 bits |
| B | 13 bits |
| C | 13 bits |
| D | 18 bits |

The 2.5% case would require approximately 4 times the on-board RAM over the alternate approach. More importantly, 4 times more storage would be required in VRAM for the coefficients, which is too much.

Various other modifications and alterations in the method and apparatus of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method of performing dynamic purity correction for a monitor, the monitor having a face and being capable of displaying Y rows and X columns of pixels on the face, wherein each pixel has a luminescence value for each color component displayed by the monitor, the method comprising the steps of:

measuring the luminescence value for each color component for a grid of pixels on the face of the monitor, thereby forming a first grid of luminescence values, and providing the first grid of luminescence values to a correction value calculation circuit (CVCC);

generating from the first grid of luminescence values a second grid of luminescence values suitable for subsequent interpolation, the second grid of luminescence values having vertically aligned sets of luminescence values;

interpolating each vertically aligned set of luminescence values, of the second grid, for each color component to calculate control points, wherein the control points form a control point array that has Y rows and N columns, where N is an integer less than X, and where the control point array is subsequently stored in a memory;

retrieving a row of N control points stored in the memory into an interpolator;

interpolating each row of N control points retrieved from the memory to compute a corresponding row of X correction values;

multiplying each row of correction values by a corresponding row of luminescence values of an incoming video signal to produce a set of rows of modified luminescence values for each color component of each pixel of the corresponding row of luminescence values; and displaying the rows of modified pixels on the monitor.

2. The method according to claim 1, wherein the monitor displays three color components, the three color components being red, green and blue.

3. The method according to claim 1, wherein the step of measuring the luminescence values is accomplished by using a jig having an array of photometers.

4. The method according to claim 1, wherein the step of interpolating each vertically aligned set of luminescence values and the step of interpolating each row of N control points are both accomplished by using a cubic polynomial.

5. The method according to claim 4, wherein the cubic polynomial is a Catmull-Rom spline.

6. The method according to claim 1, further comprising an additional step performed after the step of multiplying but before the step of displaying, the additional step comprising performing a gamma correction for the modified luminescence values.

7. The method according to claim 1, wherein the step of interpolating each row of N control points and multiplying each row of correction values by the luminescence values of the incoming signal is performed while the corresponding row of luminescence values of the incoming signal is being raster scanned.

8. The method according to claim 5, wherein the Catmull Rom spline is calculated using forward differences, which involves shifting steps and adding steps.

9. The method according to claim 1, wherein the CVCC includes a computer memory for storing the luminescence values provided thereto after said step of measuring.

10. The method according to claim 1, wherein the step of multiplying each complete row of correction values by a corresponding row of luminescence values of an incoming video signal is done digitally.

11. An apparatus for performing dynamic purity correction for a monitor, wherein the monitor displays a plurality of pixels, each of said pixels having a luminescence value for each color component displayed by the monitor, said apparatus comprising:

sensing means for measuring the luminescence value for each color component of predetermined ones of the pixels displayed by the monitor;

correction value calculation circuit (CVCC) means coupled to the sensing means, for calculating correction values for each of the pixels displayed by the monitor based upon the luminescence values measured for each color component by the sensing means;

wherein the CVCC means also receives incoming video signals and modifies these signals according to the correction values calculated and transmits the signals, after being modified, to the monitor, and wherein the CVCC means further comprises:

means for storing the luminescence values in a computer memory as a first set of grids; and means for interpolating the luminescence values to form the correction values.

12. The apparatus according to claim 11, wherein each of the grids in the first set has a first set of vertical columns and a first set of horizontal rows and represents one color component, and wherein the means for interpolating includes:

means for interpolating the luminescence values in each vertical column of the first set of vertical columns in each of the grids in the first set to form a second set of grids of correction values;

means for storing the second set of grids of correction values, each grid of said second set of grids being stored as a second set of vertical columns and a second set of horizontal rows; and means for interpolating one row of said second set of horizontal rows from each grid of said second set of grids, to form a set of complete horizontal rows of correction values; and wherein the apparatus also includes:

means for multiplying a row of luminescence values of the incoming video signals by the set of complete horizontal rows of correction values to produce a set of modified rows of incoming signals, wherein the set of modified rows of incoming signals can compensate for any luminescence variations existing in the monitor on a pixel by pixel basis for each color component.

13. The apparatus according to claim 12, wherein the means for interpolating one row of said second set of horizontal rows forms the set of complete horizontal rows of correction values during a raster scan of the incoming video signals.

14. The apparatus according to claim 12, wherein both the means for interpolating the luminescence values in each vertical column and the means for interpolating one row include a Catmull-Rom spline interpolator.

15. The apparatus according to claim 12, wherein the means for storing the second grid of correction values includes a VRAM.

16. The apparatus according to claim 11, wherein the sensing means includes a jig having an array of photometers.

17. The apparatus according to claim 12, wherein the monitor displays three color components, the three color components being red, green and blue.

18. A method for performing dynamic purity correction for a monitor, wherein the monitor displays a plurality of pixels, each of said pixels having a luminescence value for each color component displayed by the monitor, comprising the steps of:

measuring the luminescence value for each color component of predetermined ones of the pixels displayed by the monitor;

calculating correction values for each of the pixels displayed by the monitor based upon the luminescence values measured for each color component by the sensing means;

receiving incoming video signals;

modifying the video signals according to the correction values calculated; and transmitting the video signals, after said video signals have been modified according to the correction values, to the monitor, wherein the step of calculating correction values includes the steps of:

storing the luminescence values in a computer memory as a first set of grids;

interpolating the luminescence values to form the correction values.

19. The method according to claim 18, wherein each of the grids in the first set has a first set of vertical columns and a first set of horizontal rows and represents one color component, and wherein the step of interpolating the luminescence values includes the steps of:

interpolating the luminescence values in each vertical column of the first set of vertical columns in each of the grids in the first set to form a second set of grids of correction values;

storing the second set of grids of correction values, each grid of said second set of grids being stored as a second set of vertical columns and a second set of horizontal rows; and interpolating one row of said second set of horizontal rows from each grid of said second set of grids, to form a set of complete horizontal rows of correction values, wherein the complete horizontal row is used during the step of modifying the video signal.

20. The method according to claim 19, wherein the step of interpolating one row of said second set of horizontal rows forms the set of complete horizontal rows of correction values during a raster scan of the incoming video signals.

21. The method according to claim 20, wherein both the step of interpolating the luminescence values in each vertical column and the step of interpolating one row are accomplished by using a Catmull-Rom spline interpolator.

22. The method according to claim 21, wherein the step of measuring is accomplished by using a jig having an array of photometers.

23. The method according to claim 22, wherein the monitor displays three color components, the three color components being red, green and blue.

* * * * *